United States Patent [19]
Fujimoto

[11] Patent Number: 6,116,086
[45] Date of Patent: Sep. 12, 2000

[54] VIBRATING GYROSCOPE

[75] Inventor: Katsumi Fujimoto, Toyama-ken, Japan

[73] Assignee: Murata Manufacturing Co., Ltd., Japan

[21] Appl. No.: 09/207,294

[22] Filed: Dec. 8, 1998

[30] Foreign Application Priority Data

Dec. 10, 1997 [JP] Japan ................................. 9-340011

[51] Int. Cl.$^7$ ........................................................ G01P 9/04
[52] U.S. Cl. ................................... 73/504.14; 73/504.12; 310/329; 310/331
[58] Field of Search ........................... 73/504.12, 504.14, 73/504.15, 504.16; 310/331, 332, 329, 366

[56] References Cited

U.S. PATENT DOCUMENTS 4,431,935  2/1984  Rider .
5,635,786  6/1997  Fujimoto et al. ..................... 73/504.12
6,023,973  2/2000  Yabe et al. ............................ 73/504.12

FOREIGN PATENT DOCUMENTS 0685704  12/1995  European Pat. Off. .
7-332988  12/1995  Japan .

*Primary Examiner*—John E. Chapman
*Attorney, Agent, or Firm*—Ostrolenk, Faber, Gerb & Soffen, LLP

[57] ABSTRACT

A vibrating gyroscope includes a vibrator constructed by bonding a first piezoelectric substrate polarized in the thickness direction and a second piezoelectric substrate polarized in the same direction as the first piezoelectric substrate, through an intermediate electrode. The vibrator includes two first strip electrodes, provided on one main face of the first piezoelectric substrate in the longitudinal direction of the first piezoelectric substrate so as to be spaced from each other, and a second strip electrode provided substantially on the whole of the second strip electrode. The vibrator includes an electrode film formed on the whole of one end-face thereof by a sputtering method.

17 Claims, 8 Drawing Sheets

VIBRATING GYROSCOPE

BACKGROUND OF THE INVENTION

1. Field of the Invention

The present invention relates to a vibrating gyroscope and more particularly to a vibrating gyroscope which is used in a video camera for prevention of hand shaking or is used in a car-navigation system, a pointing device or the like.

2. Description of the Related Art

A first conventional vibrating gyroscope is disclosed in Japanese Unexamined Patent Publication No. 7-332988 and will be described with reference to FIG. 9.

As shown in FIG. 9, the first conventional vibrating gyroscope is designated by the reference numeral 100 and includes a vibrator 101. The vibrator 101 is made up of a first piezoelectric substrate 103 polarized in the thickness direction and a second piezoelectric substrate 104 polarized in the opposite direction to the first piezoelectric substrate 103, which are bonded and integrated through an intermediate electrode 105. The vibrator 101 further includes two divided electrodes 106a, 106b provided on one main face of the first piezoelectric substrate 103 so as to be spaced along the longitudinal direction of the first piezoelectric substrate 103, and a common electrode 107 formed on the entire one main face of the second piezoelectric substrate 104.

In the case of the vibrator 101, an oscillation circuit 130 as a driving means is connected between the common electrode 107 and the divided electrodes 106a, 106b. A detection circuit is connected to the divided electrodes 106a, 106b. When a driving signal is applied by the oscillation circuit 130, the vibrator 101 vibrates under a bending mode, and a detection signal in correspondence to a rotation angular velocity of the vibrator 101 is produced between the divided electrodes 106a, 106b, and supplied to the detection circuit 140.

Japanese Unexamined Patent Publication 7-332988 also discloses a vibrating gyroscope as shown in FIG. 10.

This second conventional vibrating gyroscope 110 includes a vibrator 111. The vibrator 111 is made up of a first piezoelectric substrate 113 polarized in the thickness direction and a second piezoelectric substrate 114 polarized in the same direction as the first piezoelectric substrate 113, which are bonded and integrated through an intermediate electrode 115. The vibrator 111 further includes first two divided electrodes 116a, 116b provided on one main face of the first piezoelectric substrate 113 so as to be spaced along the longitudinal direction of the first piezoelectric substrate 113. Two second divided electrodes 117a, 117b are provided on one main face of the second piezoelectric substrate 114 spaced in the longitudinal direction of the second piezoelectric substrate 114.

In the case of the vibrator 111, an oscillation circuit 130 as a driving means is connected between one 116a of the first two divided electrodes and the intermediate electrode 115 and between the intermediate electrode 115 and one 117b of the second two divided electrodes. A detection circuit 140 is electrically connected between one 116a of the first two divided electrodes and one 117b of the second two divided electrodes. The other 116b of the first two divided electrodes and the other 117a of the second two divided electrodes are electrically connected to each other. When a driving signal from the oscillation circuit 130 is supplied, the vibrator 111 vibrates under a bending mode, and detection signals in correspondence to a rotation angular velocity of the vibrator 111 are produced between the first two divided electrodes 116a, 116b and between the second two divided electrodes 117a, 117b. The signal composed of the detection signal produced between the first two divided electrodes 116a, 116b and the detection signal produced between the second two divided electrodes 117a, 117b is detected by the detection circuit 140.

The conventional vibrating gyroscopes explained above have had the following problems.

In the case of the conventional vibrating gyroscope 100, the bending displacement of the vibrator is half of that of the vibrator of the conventional vibrating gyroscope 110, when the applied driving voltages are equal. The bending displacement has a correlation to the sensitivity of a vibrating gyroscope. As the displacement is larger, so the sensitivity is higher. Thus, the vibrating gyroscope 100 has a lower sensitivity than the vibrating gyroscope 110.

For miniaturization of a vibrating gyroscope, it is necessary to reduce the size of the vibrator. However, reduction of the size of the vibrator causes the sensitivity of the vibrating gyroscope to be reduced. To counteract this, the voltage could be made higher to obtain a higher sensitivity. Recently, however, there has been a greater demand for application of low voltage devices in the vibrating gyroscope market. Accordingly, it is unreasonable to increase the voltage. Thus, there has been a problem in recent years to construct a vibrating gyroscope in which the vibrator can be miniaturized and have a sufficient sensitivity.

By utilizing the vibrating gyroscope 110 of which the bending displacement is twice as much as that of the vibrating gyroscope 100, it is possible to construct a vibrating gyroscope which can-be miniaturized and have a sufficient sensitivity as described above. However, for the vibrating gyroscope 110, it is necessary to connect electrically the intermediate electrode 115 to an external oscillation circuit and so forth. Generally, the intermediate electrode 115 is led out by a lead wire soldered at a side face or an end face of the vibrator 111. However, it is very troublesome to solder a lead wire onto the intermediate electrode 115, since the intermediate electrode 115 is a very thin layer, and the piezoelectric substrate and solder have poor adhesive properties. It has been difficult to put the vibrating gyroscope 115 to practical use.

SUMMARY OF THE INVENTION

Accordingly, the present invention has been devised to solve the above-described problems, and it is an object of the present invention to provide a vibrating gyroscope of which the miniaturization is attainable and the sensitivity is sufficient.

To attain the above object, a vibrating gyroscope of the present invention includes: a prism-shape vibrator comprising a first piezoelectric substrate polarized in the thickness direction, a second piezoelectric substrate polarized in the thickness direction, laminated to the first piezoelectric substrate, an intermediate electrode provided between the first piezoelectric substrate and the second piezoelectric substrate, a first strip electrode formed on one main face of the first piezoelectric substrate, and a second strip electrode formed on one main face of the second piezoelectric substrate; a driving means for driving the vibrator in the thickness direction; and a detecting means for detecting a displacement produced by bending of the vibrator, wherein the vibrator is equipped with an electrode film to connect electrically at least one of the first strip electrode and the second strip electrode to the intermediate electrode.

Characteristically, the first strip electrode is so formed as to be divided in the longitudinal direction of the vibrator, the second strip electrode is formed substantially on the whole of the one main face of the second piezoelectric substrate, the electrode film is formed on either or both of a side face of the vibrator and an end face of the vibrator, the first strip electrode has both functions to input a driving signal and to output a detection signal, the second strip electrode has a function to input a driving signal, and the intermediate electrode has a function as a reference potential.

Accordingly, the intermediate electrode is led out to be electrically connected to at least one of the first strip electrode formed on the one main face of the vibrator and the second strip electrode formed on the other main face of the vibrator. For the purpose of connecting electrically the intermediate electrode to an external, a lead wire is soldered onto the first strip electrode or the second strip electrode. The connection of the lead wire can be easily carried out. In case a metallic support member is attached to the upper or lower face of the vibrator, the support member may be also used as a lead wire.

A drive voltage output from the driving means is applied to the first piezoelectric substrate and the second piezoelectric substrate, respectively, so that the overall drive voltage applied to the vibrator is twice the drive voltage applied respectively, and the amplitude of the vibrator is increased. The sensitivity of the vibrator gyro is enhanced to be sufficient for the function as vibrator gyro, since the displacement of the vibrator is increased. Even if the vibrator is miniaturized, a sufficiently high sensitivity can be obtained.

According to a vibrating gyroscope of the present invention, the intermediate electrode is led to one of the first strip electrode formed on one main face of the vibrator or the second strip electrode formed on the other main face of the vibrator. When the intermediate electrode and an external need to be electrically connected to each other, a lead wire is soldered onto the first strip electrode or the second strip electrode. The connection of the lead wire can be easily achieved. In case a metallic support member is attached to the upper face or lower face of the vibrator, the support member may be also used as the lead wire, making it unnecessary to provide an aerial wiring. The structure of the vibrating gyroscope is simplified, which enhances the degree of design freedom.

Moreover, the electrode film is formed by a thin film deposition technique. Accordingly, the electrode film can be easily formed on a side face and an end face of the vibrator.

As a drive voltage output from the driving means is applied to the first piezoelectric substrate and the second piezoelectric substrate, respectively, the overall drive voltage applied to the vibrator becomes twice, and the amplitude of the vibrator is increased with the displacement of the vibrator. Thus, the sensitivity of the vibrating gyroscope is sufficiently high. Even if the vibrator is miniaturized, a vibrating gyroscope having a high sensitivity can be obtained. Thus, the miniaturization can be attained.

By dividing the first strip electrode and the second strip electrode in the width direction of the vibrator, near to a node point of the vibrator, the intermediate electrode, the first strip electrode, and the second strip electrode become independent, which serves to stabilize the operation of the vibrator.

Moreover, a feedback signal and a drive/detection signal are completely separated. Accordingly, the efficiency of the feedback signal is not influenced with a resistance in the circuit, so that the resistance can be decided allowing for only the efficiencies of the drive signal and the detection signal. This enhances the degree of freedom of deciding a resistance and also the degree of circuit design freedom.

For the purpose of illustrating the invention, there is shown in the drawings several forms which are presently preferred, it being understood, however, that the invention is not limited to the precise arrangements and instrumentalities shown.

BRIEF DESCRIPTION OF THE DRAWING(S)

DETAILED DESCRIPTION OF EMBODIMENTS OF THE INVENTION

Hereinafter, the preferred embodiments of the present invention are explained in detail with reference to the drawings.

Figure 1:
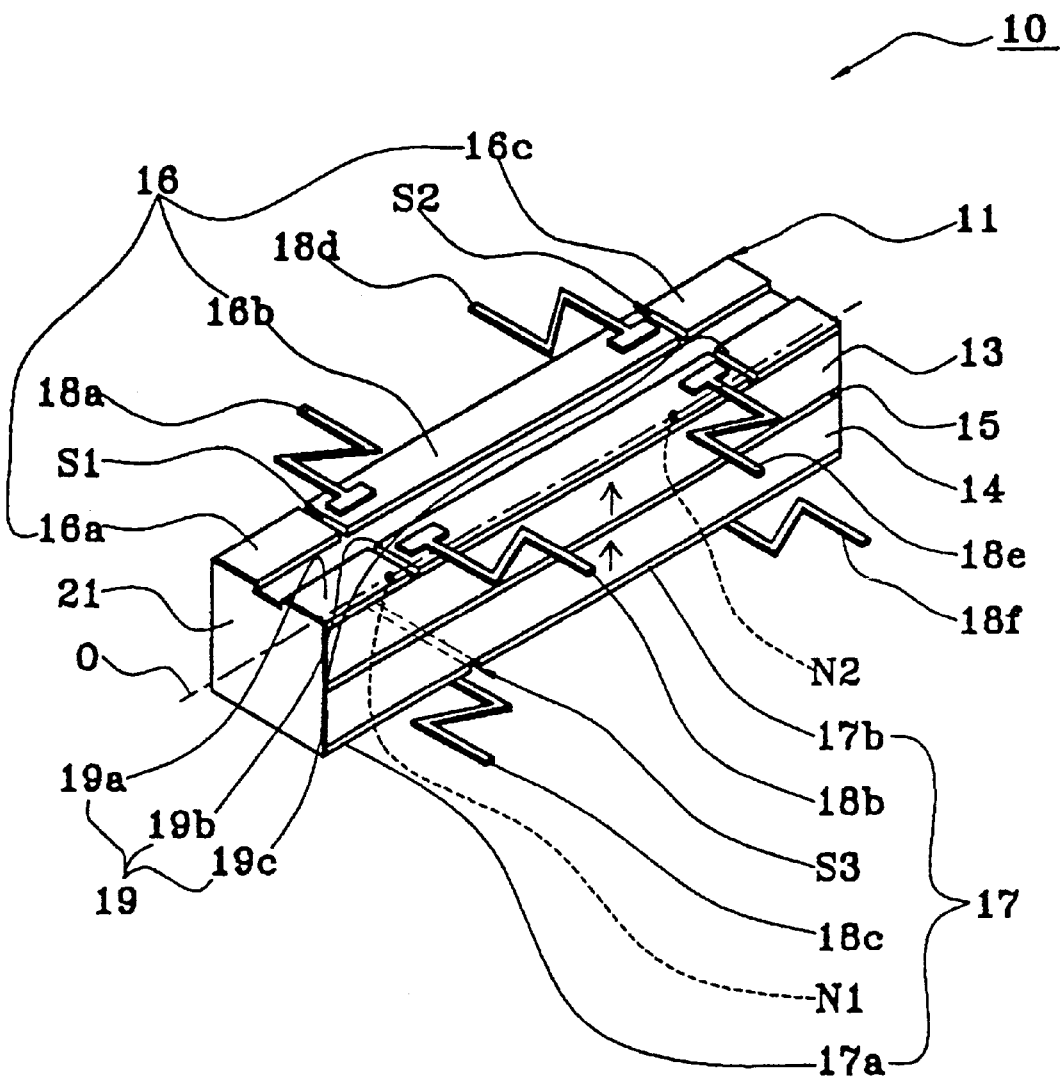
FIG. 1 is a perspective view showing the structure of a vibrating gyroscope according to a first embodiment of the present invention.
Figure 2:
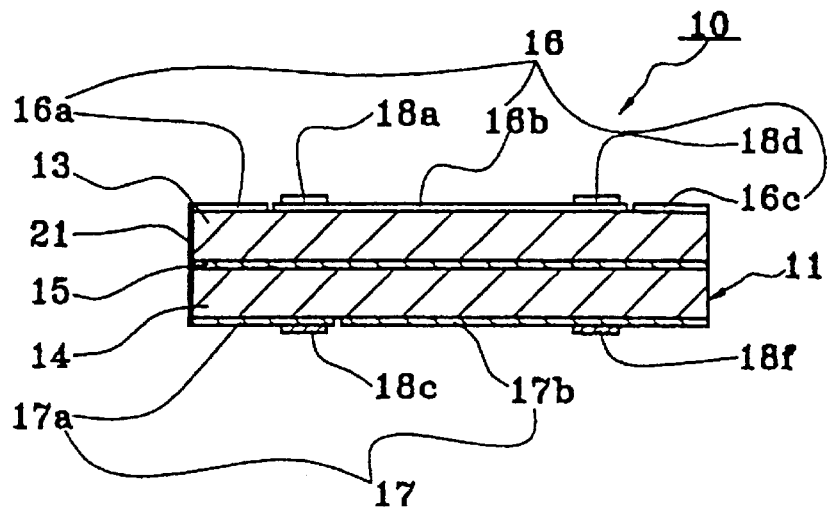
FIG. 2 is a sectional view showing the structure of the vibrating gyroscope according to the first embodiment of the present invention.

FIGS. 1 and 2 shows a vibrating gyroscope 10 having a vibrator 11. The vibrator 11 includes a first piezoelectric substrate 13 polarized, as indicated by arrows in FIG. 1, in the thickness direction and a second piezoelectric substrate 14 polarized in the same direction as the first piezoelectric substrate 13, which are bonded and integrated through an intermediate electrode 15. The vibrator 11 further includes two first strip electrodes 16, 19 formed on one main face of the first piezoelectric substrate 13 so as to be spaced with each other along the longitudinal direction. A second strip electrode 17 is formed substantially on the whole of one main face of the second piezoelectric substrate 14.

An electrode 21 is formed on the whole of one end face of the vibrator 11 by a thin film deposition means, for instance, by a sputtering method.

Dividing grooves S1, S2 are formed in the first strip electrodes 16, 19, elongating in the width direction of the vibrator, on the sides of the first strip electrodes 16, 19 which are nearer to the end face of the vibrator with respect to the positions of the first strip electrode 16, 19 corresponding to node points N1, N2 which are produced during resonation of the vibrator 11. By the grooves S1, S2, the first strip electrodes 16, 19 are divided into three portions, that is, first electrode portions 16a, 19a, second electrode portions 16b, 19b, and third electrode portions 16c, 19c, respectively, in the order of position from the end face side of the vibrator 11 on which the electrode 21 is formed.

In the second strip electrode 17, a dividing groove S3 is formed, elongating in the width direction of the vibrator 11, on the side of the second strip electrode 17 which is nearer to the center of the second strip electrode 17 with respect to the position of the second strip electrode 17 corresponding to the node N1 of the vibrator 11. By the groove S3, the second strip electrode 17 is divided into two portions, that is, a first electrode portion 17a and a second electrode portion 17b, in the order of position from the node point N1 side of the vibrator.

In the structure of the vibrator 11 formed as described above, the intermediate electrode 15 is electrically connected through the electrode 21 to the first electrode portions 16a, 19a of the first strip electrodes 16, 19 and the first electrode portion 17a of the second strip electrode 17.

Support members 18a to 18f for supporting the vibrator 11 are disposed in the portions of the first strip electrodes 16, 19 and the second strip electrode 17, corresponding to the two node points N1, N2 of the vibrator, The support members 18a to 18f are made of a metallic sheet material bent in a zigzag-shape and have enlarged portions for their connecting portions to the vibrator 11.

These support members 18a to 18f, made of a metal, have a function as a lead wire to output or input a drive signal or a detection signal to the vibrator 11.

Figure 3:
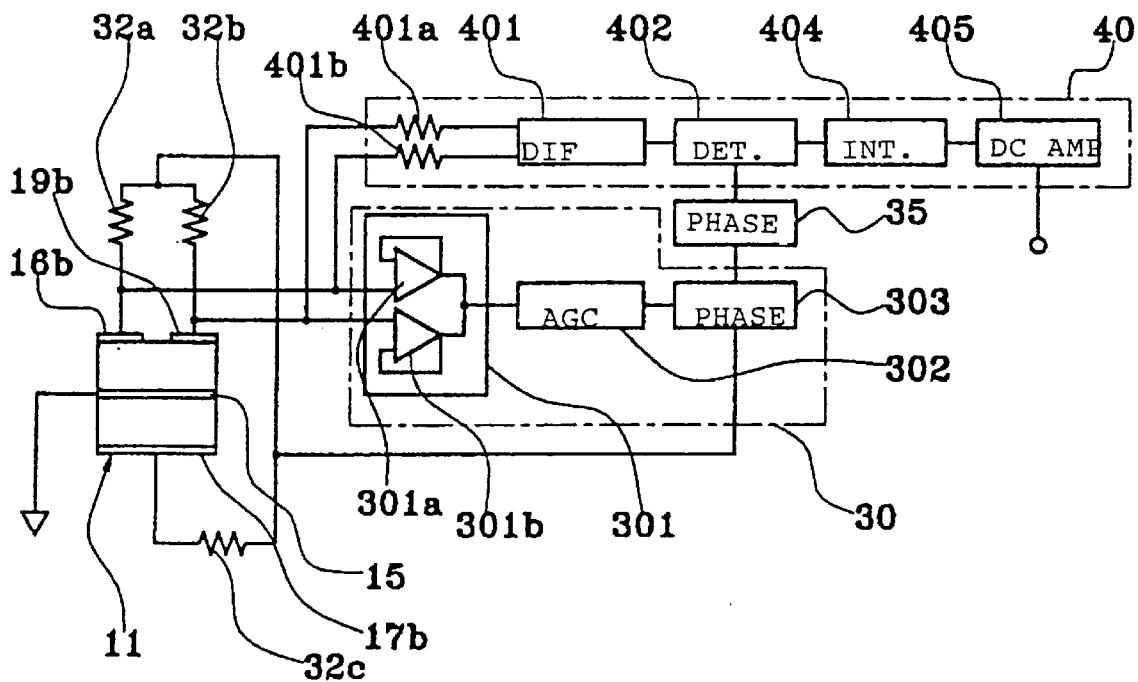
FIG. 3 is an explanatory view of an operation circuit of the vibrating gyroscope according to the first embodiment of the present invention.

The operation of the vibrating gyroscope 10 will be now described with reference to FIG. 3.

In order to apply a drive signal to the vibrator 11, one output terminal of an oscillation circuit 30 as a driving means is connected through resistors 32a, 32b to the second electrode portions 16b, 19b of the first strip electrodes 16, 19 of the vibrator 11. The other output terminal of the oscillation circuit 30 is connected through a resistors 32c to the second electrode portions 17b of the second strip electrode 17 of the vibrator 11. In addition, the second electrode portions 16b, 19b of the first two strip electrodes 16, 19 are connected to the input terminals of the oscillation circuit 30. Further, the second electrode portions 16b, 19b of the first two strip electrodes 16, 19 are connected to the input terminals of a detection circuit 40 as a detecting means. The intermediate electrode 15 of the vibrator 11 is grounded as a reference potential.

The oscillation circuit 30 comprises an adding circuit 301, an auto gain control (AGC) circuit 302, and a first phase correction circuit 303. The adding circuit 301 includes two buffer circuits 301a, 301b.

Feedback signals output from the second electrode portions 16b, 19b, of the first two strip electrodes 16, 19 of the vibrator 11 are input to the buffer circuits 301a, 301b of the adding circuit 301. The output signal from the adding circuit 301 is input to the AGC circuit 302 in which the amplitude is controlled to be on a constant level. The output signal from the AGC circuit is input to the first phase correction circuit 303 in which the output signal from the oscillation circuit, that is, the drive voltage of the drive signal and the oscillation point of the drive signal are controlled. Then, the output signal from the first phase correction circuit 303 as an output signal from the oscillation circuit 30 is input to the second electrode portions 16b, 19b of the first two strip electrodes 16, 19 of the vibrator 11 and the second electrode portion 17b of the second strip electrode 17 of the vibrator 11.

The detection circuit 40 comprises resistors 401a, 401b, a differential amplifier circuit 401, a synchronous detection circuit 402, an integration circuit 404, and a DC amplifier 405.

Detection signals output from the second electrode portions 16b, 19b, of the first two strip electrodes 16, 19 of the vibrator 11 are input through the resistors 401a, 401b to the differential amplifier circuit 401. Through the differential amplifier circuit 401, the difference between the output signals from the second electrode portions 16b, 19b of the first two strip electrodes 16, 19 is output. The output signal from the differential amplifier circuit 401 is input to the synchronous detection circuit 402 to be detected. In this case, the detection position (timing of detection) is controlled in dependence on a signal output from the second phase correction circuit 35 connected to the first phase correction circuit 303. More particularly, to the second phase correction circuit 35, an output signal from the first phase correction circuit 303 is input and controlled, and thereafter, input to the synchronous detection circuit 402. The output signal from the synchronous detection circuit 402 is input to the integration circuit 404 to be integrated. The output signal from the integration circuit 404 is input to the DC amplifier 405 to be DC amplified and outputs as a detection signal of the detection circuit 40.

In the case of the vibrating gyroscope 10, a drive signal such as a sine wave signal output from the oscillation circuit 30 is applied across the second electrode portions 16b, 19b of the first two strip electrodes 16, 19 of the vibrator 11 and the intermediate electrode 15 as a grounded electrode, and across the second electrode portion 17b of the second strip electrode 17 of the vibrator 11 and the intermediate electrode 15.

By application of the drive signal, the first piezoelectric substrate 13 and the second piezoelectric substrate 14 vibrate under a bending mode in the opposite directions, respectively. For instance, while the first piezoelectric substrate 13 is stretched in the parallel direction to the main face of the first piezoelectric substrate 13, the second piezoelectric substrate 14 shrinks in the parallel direction to the main face of the first piezoelectric substrate 13. As a result, the vibrator 11 vibrates such as to bend in the perpendicular direction to the main face thereof. In this state, when a rotational angular velocity is added to the vibrator 11 around its center axis O, a signal, caused by a Coriolis force, in dependence on the rotation angular velocity, is produced between the second electrode portions 16b, 19b of the first two strip electrodes 16, 19. The signal caused by the Coriolis force is output through the second electrode portions 16b, 19b of the first two strip electrodes 16, 19, and detected by the detection circuit 40.

In the instant vibrating gyroscope 10, the support members 18a, 18b are connected to one output terminal of the oscillation circuit 30 and the input terminals of the oscillation circuit 30, and further to the input terminals of the detection circuit 40. The support member 18f is connected to the other output terminal of the oscillation circuit 30. The support member 18c is grounded. On the other hand, the support members 18d, 18e are not connected to a particular external circuit.

By this structure of the vibrating gyroscope 10 formed as described above, a drive voltage is applied in parallel to the first piezoelectric substrate 13 and the second piezoelectric substrate 14, respectively. This means that on a unit thickness basis, a voltage twice as great as a drive voltage output from the oscillation circuit 30 is applied to the whole of the vibrator. Thus, if a drive voltage equal to that in the first conventional example is applied, the amplitude of the vibrator is increased, and thereby the output signal is intensified. Accordingly, the vibrating gyroscope has a high sensitivity. On the other hand, if the drive voltage is reduced, as compared with that in the first conventional example, for instance, from 5 V to 3 V, the drive voltage applied per unit thickness becomes twice as compared with that in the first conventional example, so that a voltage of 6V is applied to the whole of the vibrator 11 without reduction of the amplitude. The vibrating gyroscope has an improved sensitivity and achieves power-saving.

Moreover, in the instant vibrating gyroscope 10, the intermediate electrode 15 is led by the electrode 21 to be electrically connected to the first electrode portions 16a, 19a, of the first strip electrodes 16, 19 formed on the one main face of the first piezoelectric substrate, and the first electrode portion 17a of the second strip electrode 17 formed on the one main face of the second piezoelectric substrate. Accordingly, for the purpose of making the intermediate 15 conduct, a lead wire can be attached to the first strip electrodes 16, 19, and the second strip electrode 17. As compared with the second conventional example, the attachment of a lead wire is achieved more conveniently, since a sufficient electrode area is provided. It is unnecessary to attach a lead wire to the side face of the intermediate electrode 15. Thus, the attachment process and an attachment apparatus are simplified. In addition, as shown in the above described embodiment, in the case the vibrating gyroscope is so configured that the support members 18a to 18f of the vibrator 11 is also used as a lead wire, the process of attaching the lead wire can be omitted. As the lead wire is unnecessary, the degree of freedom of designing the internal structure of the vibrating gyroscope 10 is enhanced. The miniaturization of the vibrating gyroscope can be attained, and the cost-saving can be realized.

Figure 4:
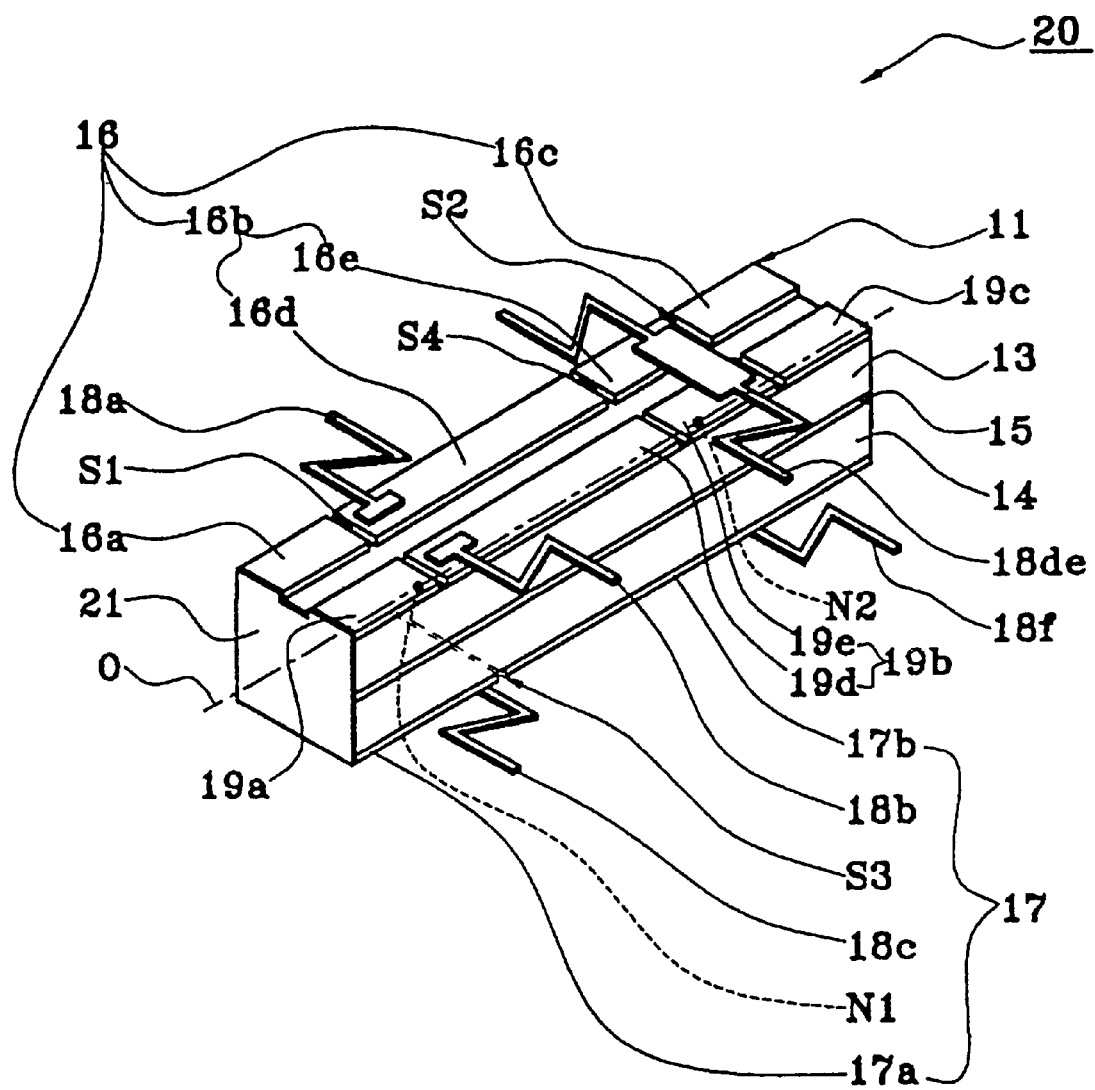
FIG. 4 is a perspective view showing the structure of a vibrating gyroscope according to a second embodiment of the present invention.
Figure 5:
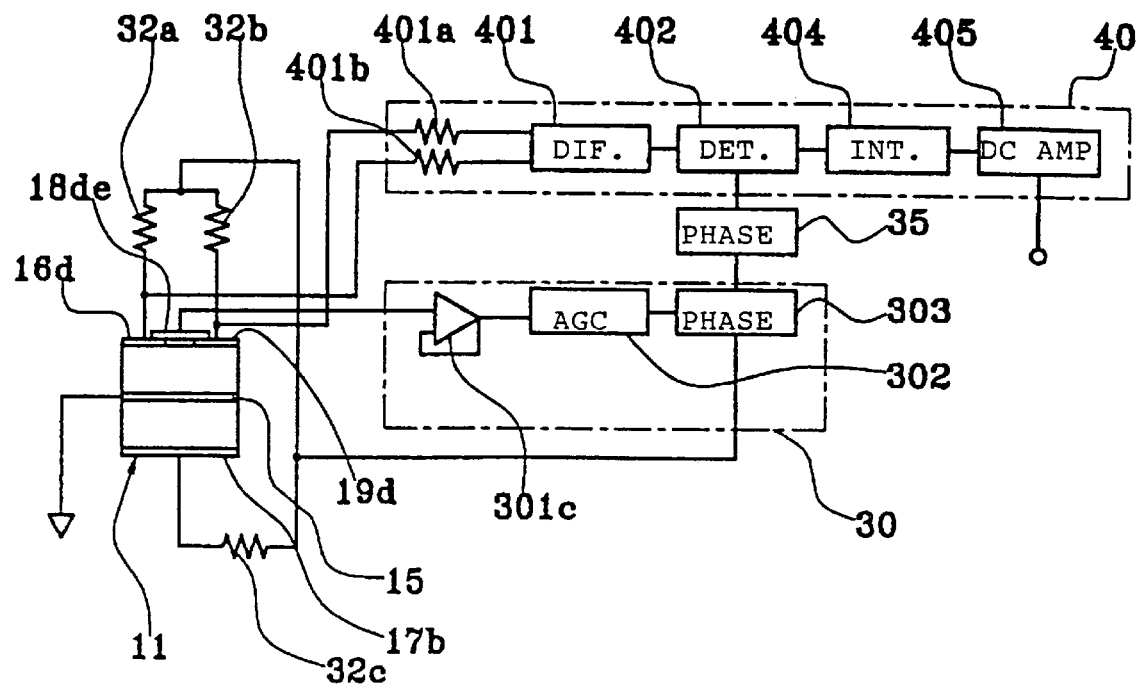
FIG. 5 is an explanatory view of an operation circuit of the vibrating gyroscope according to the second embodiment of the present invention.

A vibrating gyroscope according to a second embodiment of the present invention will be now described with reference to FIGS. 4, 5. In these figures, like parts are designated by like reference numerals, and the description will be abbreviated.

A vibrating gyroscope 20 is different from the vibrating gyroscope 10 in that the second electrode portions 16b, 19b of the first strip electrodes 16, 19 are further divided by a dividing line S4 into fourth electrode portions 16d, 19d of the first strip electrodes 16, 19, and the fifth electrode portions 16e, 19e of the first strip electrodes 16, 19, and as support members on the fifth electrode portions 16e, 19e, a support member 18de is so formed as to have a shape that the support members 18d, 18e in the vibrating gyroscope 10 are integrated.

The support members 18a, 18b in the vibrating gyroscope 20 are connected to one output terminal of the oscillation circuit 30 and to the input terminal of the detection circuit 40. The support member 18f is connected to the other output terminal of the oscillation circuit 30. The support member 18c is grounded. The support members 18de is connected to the input terminal of the oscillation circuit 30 to output a feedback signal through the fifth electrode portions 16e, 19e.

In the case of the vibrating gyroscope 20, the add circuit 301, as provided in the oscillation circuit 30 of the vibrating gyroscope 10, may comprises only one buffer circuit 301c.

By the structure of the vibrating gyroscope 20 formed as described above, a feedback signal and a drive/detection signal are completely separated, so that the efficiency of the feedback signal is not influenced with resistors 32a, 32b, and 32c. In other words, in the case of the vibrating gyroscope 10, the resistances of the resistors 32a, 32b, and 32c are determined, allowing for all the efficiencies of the drive signal, the detection signal, and the feedback signal. In the case of the vibrating gyroscope 20, the resistances of the resistors 32a, 32b, and 32c can be determined in consideration of only the efficiencies of the drive signal and the detection signal. Thus, the degree of freedom of determining the resistances and the degree of circuit design freedom is increased.

Figure 6:
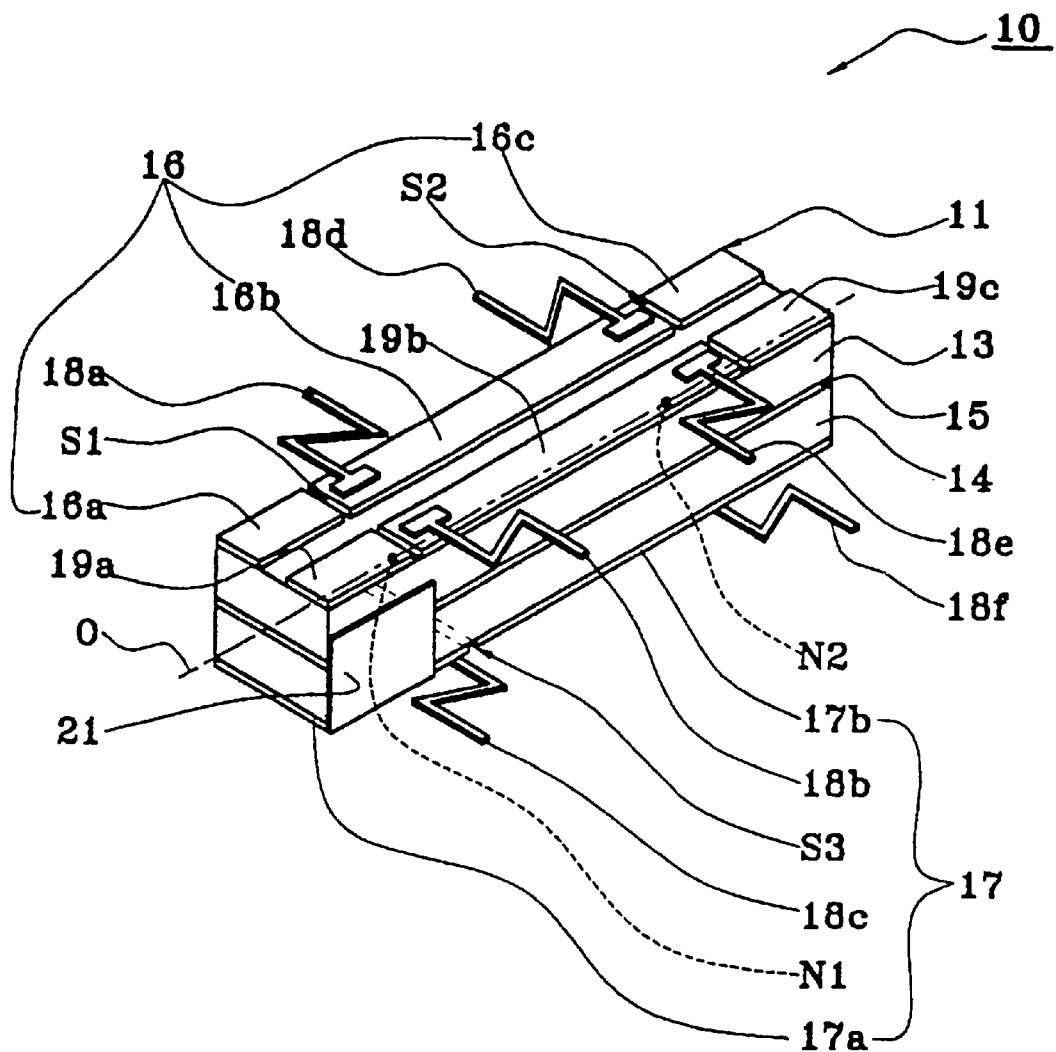
FIG. 6 is a perspective view showing another example of the formation-structure of an electrode film of a vibrating gyroscope according to a further embodiment of the present invention.

The vibrating gyroscope of the present invention is not limited to the above described embodiments. For instance, as shown in FIG. 6, the electrode 21 may be formed on a longitudinal side face of the vibrator 11. In this case, the electrode film 21 may be formed in the area ranging from the intermediate electrode 15 to the first electrode portion 17a of the second strip electrode 17, restricted for conduction.

Figure 7:
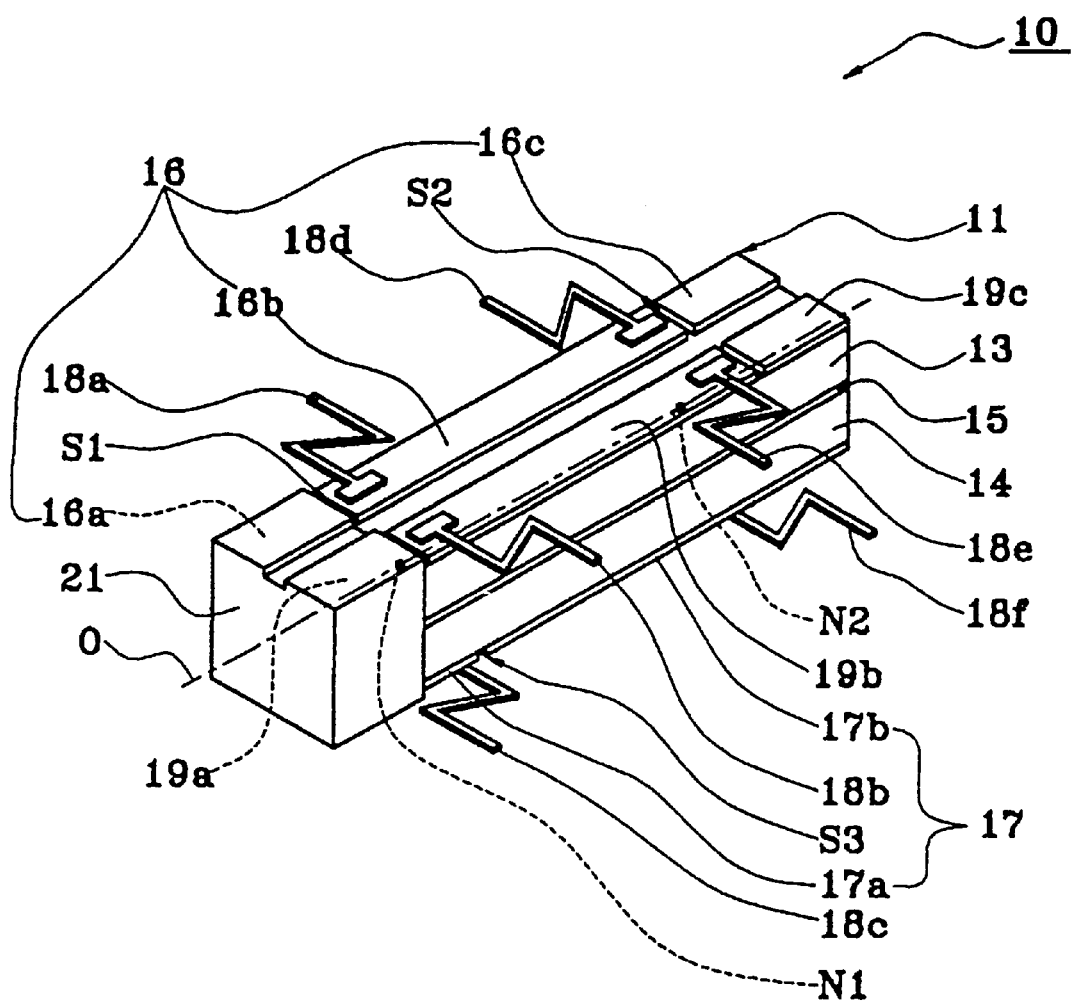
FIG. 7 is a perspective view showing still another example of the formation-structure of an electrode film of a vibrating gyroscope according to a further embodiment of the present invention.

Moreover, as shown in FIG. 7, the electrode 21 may be formed on an end-face of the vibrator 11 and on the whole of a side-face portion thereof extending from the node point N1 position to the end-side, though not shown particularly.

The electrode 21 may be formed on the both-sided end faces of the vibrator 11.

These electrodes 21 are formed by a thin film deposition technique such as sputtering method. Further, the electrodes may be formed by a thick film formation technique such as printing. However, it is very technically difficult to print on the end face and a side face of the vibrator 11. On the other hand, sputtering can be carried out while the portion of the vibrator 11 on which the electrode 21 does not required to be formed is masked, so that the electrode 21 can be formed very conveniently on a side-face and an end-face of the vibrator 11.

Figure 8:
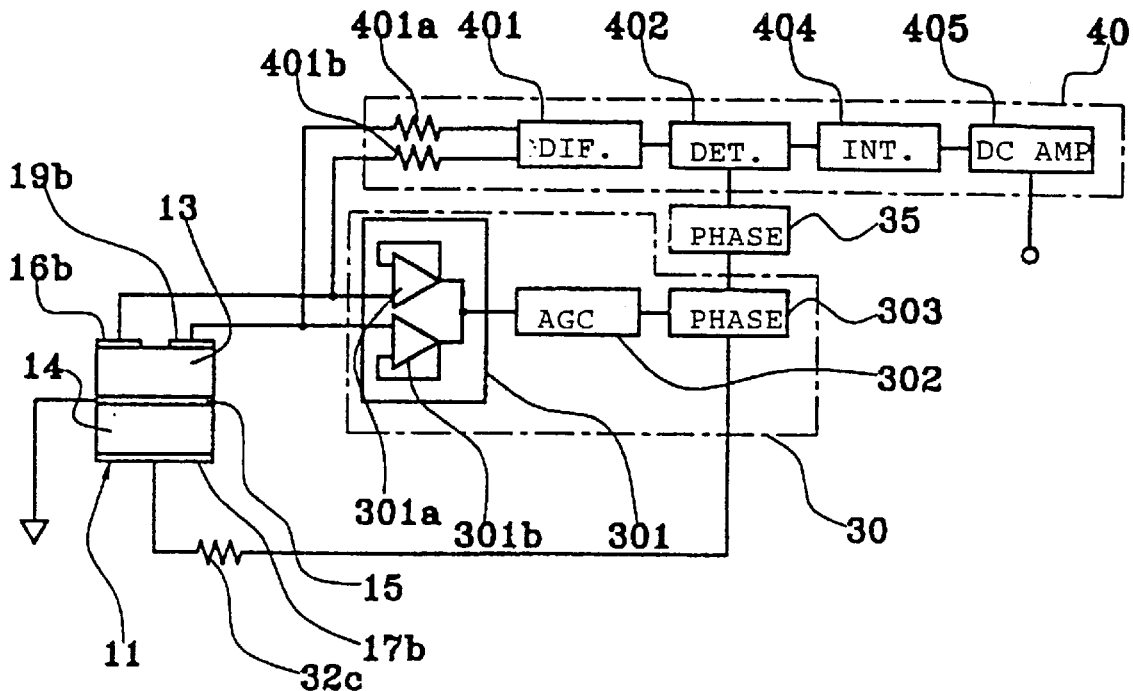
FIG. 8 is an explanatory view showing another example of the operation circuit of a vibrating gyroscope according to a still further embodiment of the present invention.
Figure 9:
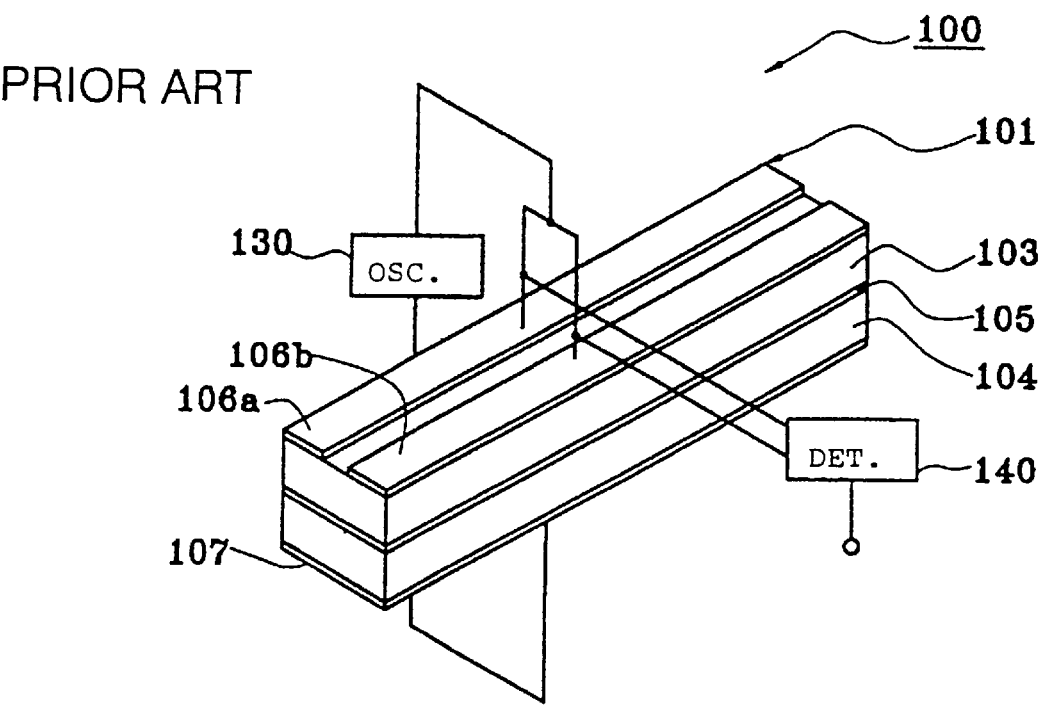
FIG. 9 is an explanatory perspective view showing a first example of a conventional vibrating gyroscope.
Figure 10:
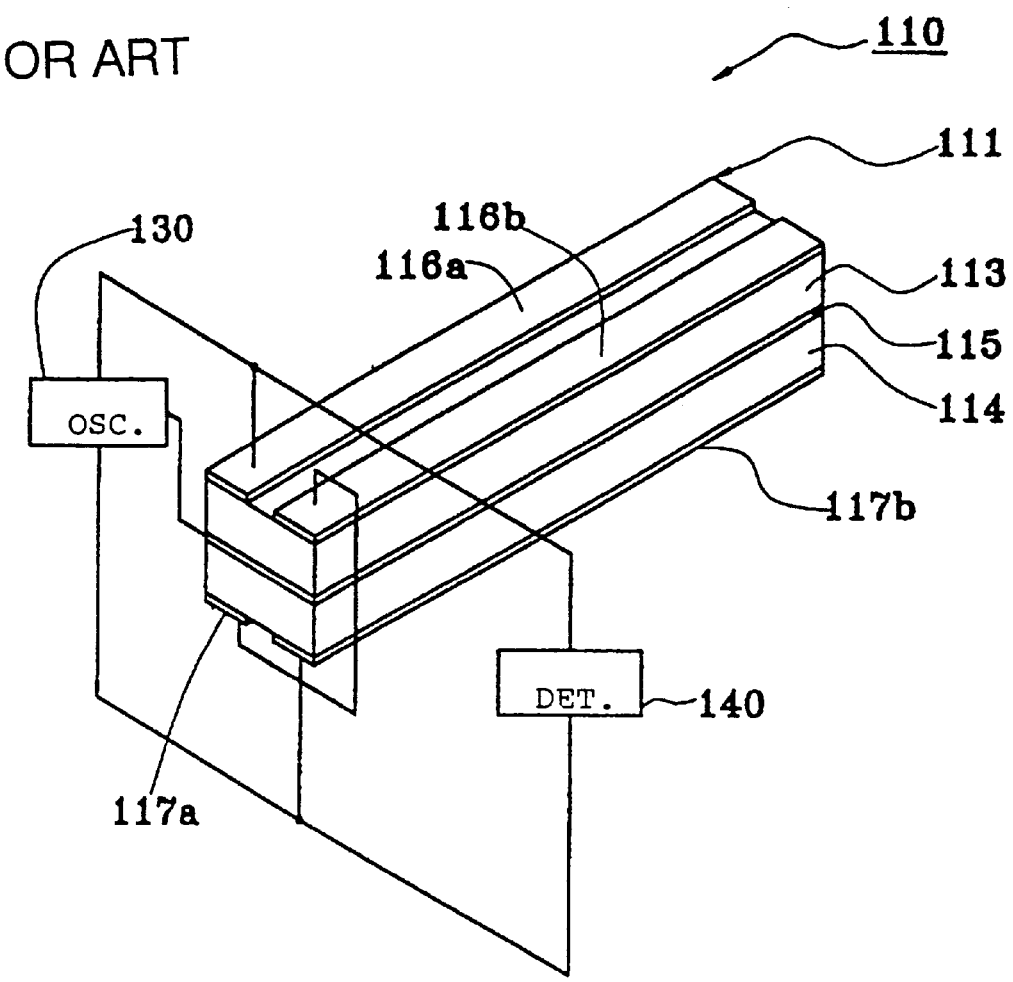
FIG. 10 is an explanatory perspective view showing a second example of a conventional vibrating gyroscope.

In the above described embodiment, as a system of driving the vibrating gyroscope, a drive signal is applied to the first piezoelectric substrate 13 and the second piezoelectric substrate 14. However, the driving system according to the present invention is not restricted to the above-described system. For instance, as shown in FIG. 8, the drive system may be so configured that a drive signal is applied to only the second strip electrode 17 of the second piezoelectric substrate 14, the intermediate electrode 15 is used as a reference potential, and a detection signal is detected through the first two strip electrodes 16, 19 formed on one main face of the first piezoelectric substrate 13. In this case, a voltage per unit area applied to the vibrator 11 is half of that in the first and the second embodiment. Accordingly, the drive systems in accordance with the first and the second embodiment are preferable.

In the second embodiment, the electrodes for outputting feedback signals are formed by dividing the first strip electrode 16. However, means for forming an electrode for outputting a feedback signal is not restricted to the above-described division. For instance, the second strip electrode 17 may be divided in the width direction to form an electrode for outputting a feedback signal.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A vibrating gyroscope comprising:

a bar-shape vibrator including a first piezoelectric substrate polarized in a thickness direction, a second piezoelectric substrate polarized in the same thickness direction, laminated to the first piezoelectric substrate, an intermediate electrode provided between the first piezoelectric substrate and the second piezoelectric substrate, a first strip electrode formed on one main face of the first piezoelectric substrate, and a second strip electrode formed on one main face of the second piezoelectric substrate;

an interconnection electrode to connect electrically the intermediate electrode to a portion of at least one of the first strip electrode and the second strip electrode, the portion being divided from the remaining portion of the at least one of the first strip electrode and the second strip electrode;

a driving means for driving the vibrator in the thickness direction; and a detecting means for detecting a displacement produced by bending of the vibrator, wherein the portion and the remaining portion are divided from one another in a width direction and the first strip electrode is divided in a longitudinal direction of the vibrator and is connected to both the drive means and the detection means, the second strip electrode is connected to the drive means, and the intermediate electrode is connected to a reference potential.

2. A vibrating gyroscope according to claim 1, wherein the interconnection electrode is formed by a thin film deposition.

3. A vibrating gyroscope according to claim 1, wherein the interconnection electrode is formed on either or both of a side face of the vibrator and an end face of the vibrator.

4. A vibrating gyroscope according to claim 1, wherein the vibrator has opposing end faces and the intermediate electrode is electrically connected to at least one of the first strip electrode and the second electrode on the end face of the vibrator which is positioned near to a node point of the vibrator, and the first strip electrode or the second strip electrode is divided in the width direction of the vibrator at a position near the node point of the vibrator.

5. A vibrating gyroscope according to claim 4, wherein the first strip electrode or the second strip electrode is further divided in the width direction, and the divided first strip electrode or second strip electrode function to output a feedback signal.

6. A vibrating gyroscope comprising:

a bar-shape vibrator including a first piezoelectric substrate polarized in a thickness direction, a second piezoelectric substrate polarized in the same thickness direction, laminated to the first piezoelectric substrate, an intermediate electrode provided between the first piezoelectric substrate and the second piezoelectric substrate, a first strip electrode formed on one main face of the first piezoelectric substrate, and a second strip electrode formed on one main face of the second piezoelectric substrate;

an interconnection electrode to connect electrically the intermediate electrode to a portion of at least one of the first strip electrode and the second strip electrode, the portion being divided from the remaining portion of the at least one of the first strip electrode and the second strip electrode;

an oscillation circuit for driving the vibrator in the thickness direction; and a detection circuit for detecting a displacement produced by bending of the vibrator wherein the portion and the remaining portion are divided from one another in a width direction and the first strip electrode is divided in a longitudinal direction of the vibrator into a pair of first strip electrodes and is connected to both the drive means and the detection means, the second strip electrode is connected to the drive means, and the intermediate electrode is connected to a reference potential.

7. A vibrating gyroscope according to claim 6, wherein the interconnection electrode is formed by a thin film deposition.

8. A vibrating gyroscope according to claim 6, wherein the interconnection electrode is formed on either or both of a side face of the vibrator and an end face of the vibrator.

9. A vibrating gyroscope according to claim 6, wherein the vibrator has opposing end faces and the intermediate electrode is electrically connected to at least one of the first strip electrode and the second electrode on the end face of the vibrator which is positioned near to a node point of the vibrator, and the first strip electrode or the second strip electrodes are divided in the width direction of the vibrator at a position near the node point of the vibrator.

10. A vibrating gyroscope according to claim 9, wherein the first strip electrodes or the second strip electrode are further divided in the width direction, and the divided first strip electrode or second strip electrode function to output a feedback signal.

11. A vibrating gyroscope according to claim 9, wherein the first strip electrodes are divided and further divided in the width direction, by first and second grooves into first strip electrode portions adjacent to said end face near to said node point, second strip electrode portions adjacent to said first electrode portions but separated therefrom by said first groove and third electrode portions adjacent to said second electrode portions but separated therefrom by said second groove.

12. A vibrating gyroscope according to claim 11, wherein the second strip electrode is divided by a groove in first and second portions, the first portion being adjacent to said end face near to said node point.

13. A vibrating gyroscope according to claim 12, wherein the oscillation circuit has a first and a second input terminal connected to the second electrode portions of the first strip electrodes, a first output terminal connected to the second electrode portions and a second output terminal connected to the second electrode portions of the second strip electrodes.

14. A vibrating gyroscope according to claim 13, wherein the detection circuit has first and second input terminals connected respectively to the second electrode portions of the first strip electrodes.

15. A vibrating gyroscope according to claim 11, wherein the second electrode portions are further divided in the width direction by a third groove into fourth and fifth electrode portions, and the fifth portions are connected together.

16. A vibrating gyroscope according to claim 15, wherein the oscillation circuit has an input terminal connected to the fifth electrode portions of the first strip electrodes, a first output terminal connected to the fourth electrode portions of the first strip electrodes and a second output terminal connected to the second electrode portions of the second strip electrode.

17. A vibrating gyroscope according to claim 16, wherein the detection circuit has first and second input terminals connected respectively to the second electrode portions of the first strip electrodes.

\* \* \* \* \*